US006561478B2

(12) United States Patent
Cundiff et al.

(10) Patent No.: US 6,561,478 B2
(45) Date of Patent: May 13, 2003

(54) RESIN TRANSFER MOLD

(75) Inventors: Thomas R. Cundiff, Edgewood, WA (US); Scott A. Miller, Des Moines, WA (US); Donald L. Conaway, Gig Harbor, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/974,128

(22) Filed: Oct. 8, 2001

(65) Prior Publication Data

US 2002/0015754 A1 Feb. 7, 2002

Related U.S. Application Data

(62) Division of application No. 09/544,652, filed on Apr. 6, 2000, now Pat. No. 6,319,447.
(60) Provisional application No. 60/128,463, filed on Apr. 9, 1999.

(51) Int. Cl.[7] .............................. B22D 5/00; B28B 7/16; B28B 7/28
(52) U.S. Cl. ......................... 249/91; 249/93; 249/142; 249/177

(58) Field of Search ................................ 249/63, 91, 93, 249/142, 144, 177; 264/275

(56) References Cited

U.S. PATENT DOCUMENTS

| 4,778,145 A | * | 10/1988 | Savori et al. ................. 249/83 |
| 4,824,627 A | * | 4/1989 | Hammer et al. ....... 264/211.21 |
| 5,028,291 A | * | 7/1991 | Delgrange et al. .......... 156/245 |

* cited by examiner

*Primary Examiner*—Christopher A. Fiorilla
(74) *Attorney, Agent, or Firm*—John C. Hammer

(57) ABSTRACT

The present invention relates to a seal pin indexed precisely in a resin transfer molding die to assure the desired resin-to-fiber ratio in the mold part, and, thereby, to produce reliably and consistently a part of minimum weight with adequate strength. The index/resin seal pin of the present invention for RTM mold dies is novel in that it provides the seal (via replaceable O-rings) on the threaded stem of the pin to prevent low viscosity resin from invading the threads, bolts pins, or other elements of the internal mandrel. The pin allows the entire inner mandrel to be enclosed and sealed within the mold cavity, simplifying the sealing system. The invention also relates to a method for using the seal pin in a resin transfer molding process.

2 Claims, 2 Drawing Sheets

1

RESIN TRANSFER MOLD

REFERENCE TO RELATED APPLICATION

The present application is a divisional application based upon U.S. patent application Ser. No. 09/544,652, filed Apr. 6, 2000, which claims the benefit of U.S. Provisional Patent Application 60/128,463, filed Apr. 9, 1999.

TECHNICAL FIELD

The present invention relates to a seal pin indexed precisely in a resin transfer molding die to assure the desired resin-to-fiber ratio in the mold part, and, thereby, to produce reliably and consistently a part of minimum weight with adequate strength.

BACKGROUND ART

Reducing the cost of aerospace parts requires a switch to reliable, repeatable processes that yield parts, which meet the rigorous requirements of aerospace. In aerospace, the issues of absolute weight, shape, strength, and durability must be traded during the design of a part. A factor often ignored during this design trade is the cost of manufacture. Often, however, safety forces part designs that are expensive to manufacture. Resin transfer molding (RTM) is promising as a process to replace complicated built-up metal assemblies with one-piece fiber-reinforced resin composite alternatives. One challenge with RTM is ensuring that the resin-to-fiber ratio in the molded part is adequate everywhere in the part so that the molded part will have the design strength and durability. The present invention is an improvement in RTM using a seal pin in the mold die to index the preform for the part reliably and precisely on the mold cavity on an inner mandrel that is completely sealed within the die set.

Resin transfer molding (RTM) is a process by which a resin is pumped at low viscosities and low pressures into a closed mold die set containing a preform of dry fabric to infuse resin into the preform and to make a fiber-reinforced composite part. The RTM process can be used to produce at low cost composite parts that are complex in shape. These parts typically require continuous fiber reinforcement along with inside mold line and outside mold line controlled surfaces. The ability to include and place continuous fiber reinforcement in large and small structures sets RTM apart from other liquid molding processes.

Some RTM mold die sets require outer dies to define a cavity and an inner mandrel that seats in the cavity to define a hollow region in the molded part. Often the mandrel must be assembled from multiple parts so that it can be disassembled and removed from the molded part. RTM die sets that used mandrels usually are configured so that the mandrel is inserted through an opening in the dies. Sealing the base plate of the mandrel with the opening in the dies was challenging. With the seal/index pins of the present invention, the mandrel can be positioned entirely within the mold cavity, allowing a simpler seal system between the dies.

SUMMARY OF THE INVENTION

The present invention relates to a seal pin indexed precisely in a resin transfer molding die to assure the desired resin-to-fiber ratio in the mold part, and, thereby, to produce reliably and consistently a part of minimum weight with adequate strength. The index/resin seal pin of the present invention for RTM mold dies provides a seal (via replaceable O-rings) on the threaded stem of the pin to prevent low viscosity resin from invading the threads, bolts pins, or other elements of the assembled parts that form the inner mandrel. The pin allows the entire inner mandrel to be enclosed completely and sealed within the mold cavity, simplifying the sealing system. Preventing resin flow into the mandrel's parts allows their easy disassembly following injection of the resin and molding of the part without causing damage to the part. The pin seats in a complementary recess in the dies to provide close tolerance indexing of the mandrel in the mold cavity. Without this indexing, the mandrel would not position the fiber preform accurately within the mold cavity. Following injection of the resin and cure, the molded part could have areas starved of resin or areas too rich in resin. Starved areas would have insufficient strength while rich areas introduce unnecessary weight.

The RTM process initially evacuates the mold cavity, exposing the mandrel to a high vacuum. Resin injection follows with an injection and cure pressure of up to 300 psi. Therefore, proper sealing is a critical feature for obtaining quality parts.

The present invention relates to the seal/index pin for the inner mandrel, to dies for accommodating the pin-mandrel assembly, and to RTM methods for using the seal/index pins on a mandrel completely enclosed within the mold cavity to mold composite parts.

DETAILED DESCRIPTION

Figure 1:
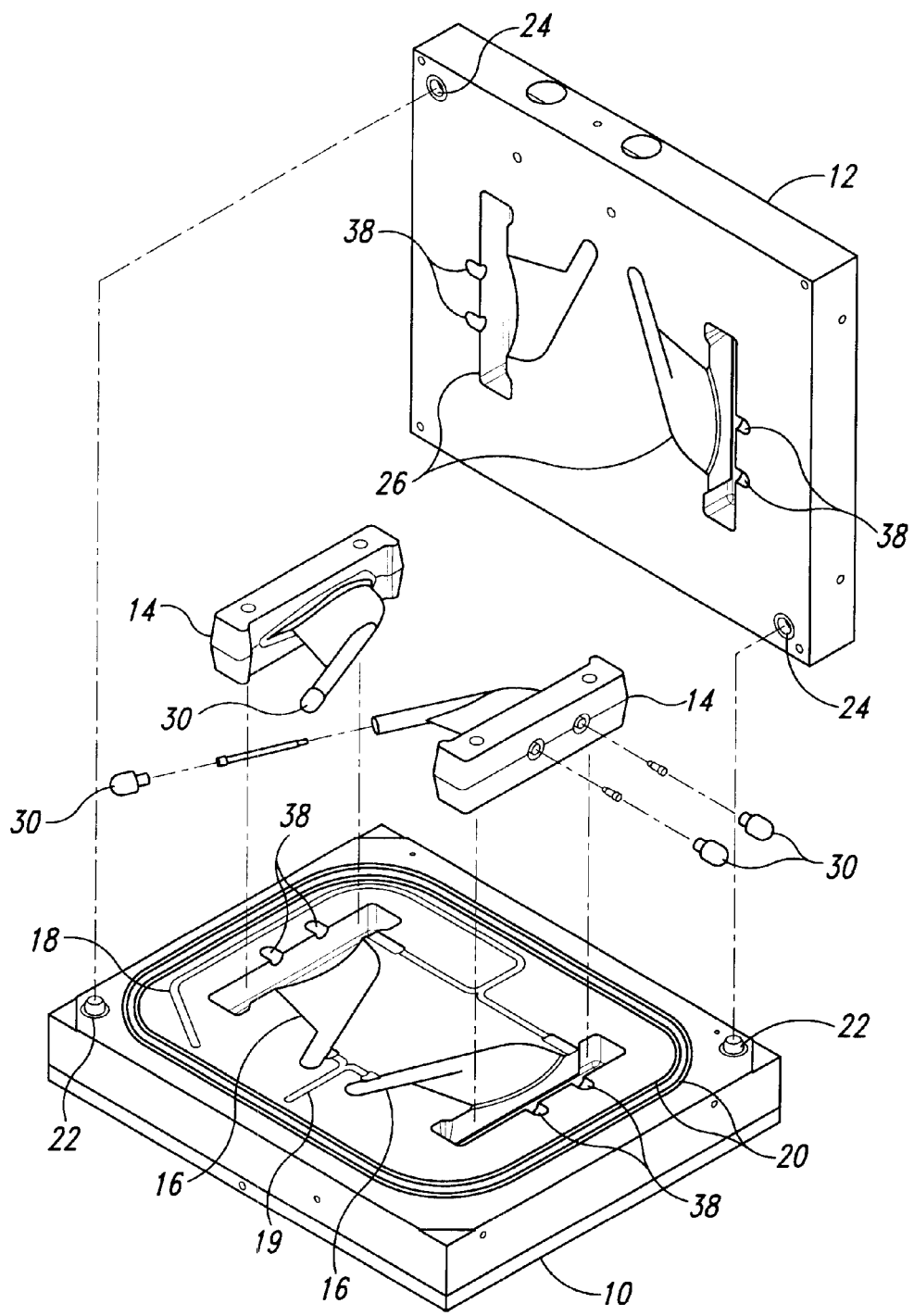
FIG. 1 is an assembly drawing of a preferred resin transfer molding (RTM) die using a seal (or index) pin of the present invention.

The seal/index pin of the present invention and its use in an improved RTM process for reliably and reproducibly molding aerospace parts of adequate strength will be described with reference to molding a drain mast. A preferred die set is shown in FIG. 1 where a matched dies 10 and 12 are fit together around a drain mast mandrel 14. Seal/index pins on the mandrel seat in complementary recesses in the dies to position the mandrel accurately in the mold cavity cut into the dies. In the particular die set shown in FIG. 1, we are able to mold two drain masts simultaneously. The bottom die 10 includes forming impressions or recesses 16 cut into the die material (typically P20 steel) to define the outer mold line (OML) on one surface of the drain mast. A channel 18 for injection of resin to the impressions 16 is also cut into die 10. A bleed channel 19 ensures that the die cavity defined by the matched impressions in dies 10 and 12 is filled completely during the injection of resin. This bleed channel directs overflow of resin from the mold cavity out of the die set. One or more (in FIG. 1, two) peripheral channels 20 in die 10 form seats for seal rings that allow an evacuated or pressurized environment around the mold impressions 16 when the dies 10 and 12 are closed and sealed. The upper die 12 also includes mold impressions 26 corresponding to the OML of the drain masts. Index posts 22 register with corresponding seats 24 in the upper die 12 for accurately positioning the recesses or impressions in the dies to define the OML of the drain mast in a mold cavity.

Figure 2:
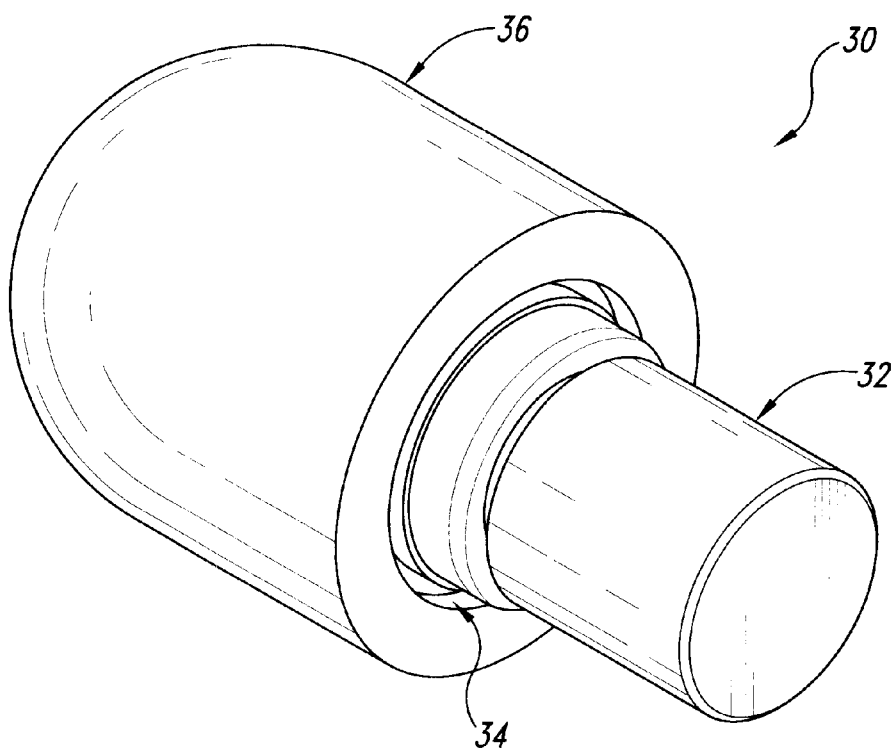
FIG. 2 is an isometric showing a preferred seal pin.
Figure 3:
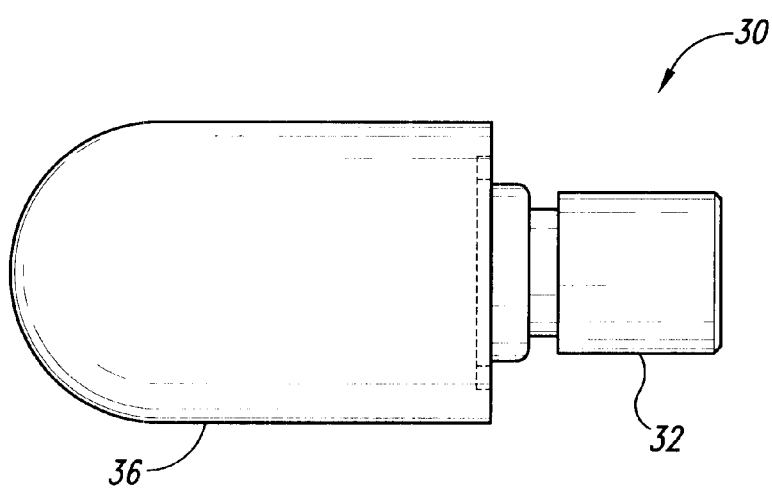
FIG. 3 is an elevation of a seal pin of the type shown in FIG. 2.

When the dies 10 and 12 are clamped together, the corresponding impressions 16 and 26 define the mold cavity that corresponds with the OML of the drain mast, in this case. The drain mast is a hollow part. To mold it, an inner mandrel 28 must be used to define the hollow by defining the inner mold line. The index/seal pins 30 of the present invention allow the mandrel to be sealed completely within a mold cavity formed into the dies 10 and 12. A fiber preform is laid up on the mandrel 28, and positioned in the mold cavity before the dies 10 and 12 are closed. After molding and cure of the injected resin, the molded part is removed from the cavity and the mandrel 28 is removed within the part. Our goal is to achieve the proper ratio of resin to fiber in all areas of the part. Doing so will produce a molded part having adequate strength. To achieve this part, the mandrel (which defines the inner mold line of the drain mast) must be accurately positioned in the die set to close tolerance to position the fiber preform accurately. We accomplish the accurate positioning with the seal/index pins 30. A preferred pin 30 is shown in isometric in FIG. 2 and in detailed elevation in FIG. 3.

For making a drain mast, three seal/index pins 30 are used for each part. Two pins are seated in threaded bores on a face of the mandrel, which defines the mouth and mounting flange of the drain mast. Each pin 30 includes a threaded stem 32 that screws into the mandrel. A sealing O-ring 34 assures a resin seal between the mandrel and the pin. When installed, the pin 30 projects from the mandrel 14 with a bulbous head 36 that has a smooth surface complementary with a seat 38 recessed into the dies 10 and 12 to prohibit migration of resin around the pin during the injection step. Leakage of resin will cause the dies to stick together and forces considerable repair time to prepare the dies for another manufacturing run. We have had success with sealing the dies using the smoothly curving shape shown in FIGS. 2 and 3, but other shapes for the head undoubtedly can be used. Our preferred shape self centers in the pin seats 38 when the mandrel is loaded into the dies, which helps us to achieve the desired tolerance and accurate positioning of the fiber preform. For aerospace parts where the goal is to produce a part of minimum weight with minimum adequate strength, the tolerances are tightly controlled.

For the drain mast, the third pin 30 seats at the end of the spout of the part and seats in an extension of the molding impression in the dies. To reduce part count, all the pins are the same. The design in this case is driven by the size of the spout tube. Commonality is a desirable feature, but is unnecessary.

If indexing is off, the fiber resin ration will cause inconsistency in the part being fabricated. Inconsistency results in the part being scrapped because some areas are resin rich while others suffer resin starvation. Such a part has inadequate strength.

When molding a drain mast, we prefer to use PR500 epoxy, a 350° F. cure epoxy available from 3M. Our process, however, is adaptable to any resin transfer A molding resin, although die design may be needed to handle resins having a high percentage of volatiles. During injection of PR500, we apply a pressure of about 40 psi. Once the die is filled, we apply a static head of about 200–300 psi (preferably 300 psi) to assure that the part will be free of porosity. Injection and cure for PR500 occurs at 350° F. Other resins may require different temperatures. The drain mast is reinforced with fiberglass cloth, but the process is amenable to carbon fiber or other reinforcement in woven, unidirectional tape, or 3-D stitched configurations.

Controlling the positioning of the mandrel in the dies with the index/seal pins ensures molding of a part having the desired resin-to-fiber ratio at every feature in the part. Such molding also ensures a part having minimum weight and the desired strength.

While we have described preferred embodiments, those skilled in the art will recognize alternatives, modifications, or variations, which might be made without departing from the inventive concept. The examples illustrate the invention and are not intended to limit it. Therefore, the description and claims should be interpreted liberally with only such limitation as is necessary in view of the pertinent prior art.

We claim:

1. A mold suitable for resin transfer molding wherein a resin is injected into the mold, the mold assuring reliable and repeatable molding of a part in a mold cavity to close tolerance with a predetermined resin/fiber ratio and strength, comprising:

a die set having a top and a bottom, the die set together defining the mold cavity;

at least one impression in the cavity for receiving a seal/index pin, the impression and pin in combination being shaped for accurately positioning a mandrel within the cavity; and a seal/index pin having a stem that functions as a stop for the mandrel and a head having a complementary shape to the impression and being self-centering in the impression to assure sealing of the cavity to egress of resin.

2. The mold of claim 1 wherein the stem is threaded for connecting with the mandrel.

\* \* \* \* \*